(12) United States Patent
Nguyen et al.

(10) Patent No.: US 6,794,340 B2
(45) Date of Patent: Sep. 21, 2004

(54) METHOD FOR REMOVING DRILL CUTTINGS FROM WELLBORES AND DRILLING FLUIDS

(75) Inventors: Philip D. Nguyen, Duncan, OK (US); Phillip C. Harris, Duncan, OK (US); Thomas E. Becker, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 235 days.

(21) Appl. No.: 10/179,698

(22) Filed: Jun. 25, 2002

(65) Prior Publication Data

US 2003/0236171 A1 Dec. 25, 2003

(51) Int. Cl.$^7$ ................................................. C09K 7/00
(52) U.S. Cl. ........................ 507/110; 507/101; 507/103; 507/118; 507/120; 507/112; 507/113; 507/114; 507/115; 507/902; 507/903; 175/66
(58) Field of Search ................................. 507/101, 103, 507/110, 118, 120, 112–115, 902, 903; 175/66

(56) References Cited

U.S. PATENT DOCUMENTS

| | | | |
|---|---|---|---|
| 4,257,903 A | 3/1981 | Kucera et al. | 252/8.5 C |
| 4,614,599 A | 9/1986 | Walker | 252/8.512 |
| 4,664,816 A | 5/1987 | Walker | 252/8.512 |
| 4,704,213 A | 11/1987 | Delhommer et al. | 252/8.512 |
| 5,591,700 A | 1/1997 | Harris et al. | 507/204 |
| 5,604,186 A | 2/1997 | Hunt et al. | 507/204 |
| 6,187,720 B1 | 2/2001 | Acker et al. | 507/238 |
| 6,209,646 B1 | 4/2001 | Reddy et al. | 166/300 |
| 6,290,001 B1 | 9/2001 | West et al. | 175/61 |
| 6,357,527 B1 | 3/2002 | Norman et al. | 166/300 |

FOREIGN PATENT DOCUMENTS

| | | | | |
|---|---|---|---|---|
| EP | 0 604 115 A2 | 6/1994 | | E21B/43/02 |

*Primary Examiner*—Philip C. Tucker
(74) *Attorney, Agent, or Firm*—Craig W. Roddy; Karen B. Tripp

(57) ABSTRACT

A method is disclosed for drilling a wellbore employing a drilling fluid providing the advantages of easy pumpability of a low viscosity fluid with the drill cuttings suspension capability of a highly viscous fluid. The viscosity of the fluid is also easily and quickly adjustable so that the fluid rheology may be adapted during drilling as the subterranean conditions change. These advantages are obtained by including in said fluid a reversibly crosslinkable polymer and an encapsulated crosslink activator. The crosslink activator causes crosslinking after the fluid is in the wellbore. The crosslinking is reversed at the well surface to reduce the viscosity of the fluid to enable the drill cuttings to be easily removed. Crosslink activator is added back to the fluid and the fluid is returned to the borehole. The amount of crosslink activator and/or crosslinkable polymer may be adjusted in the fluid to change the fluid rheology to conform the fluid to changes in the well conditions as monitored real time.

24 Claims, No Drawings

METHOD FOR REMOVING DRILL CUTTINGS FROM WELLBORES AND DRILLING FLUIDS

BACKGROUND OF THE INVENTION

1. Field of the Invention

This invention relates to drilling fluid compositions and to methods for drilling a subterranean wellbore or borehole. More particularly, this invention relates to compositions and methods for removing drill cuttings from boreholes and also for separating the cuttings from drilling fluids.

2. Description of Relevant Art

Rotary drilling methods employing drilling apparatus having a drill bit and drill stem have long been used to drill wellbores or boreholes in subterranean formations. Drilling fluids or muds are commonly circulated in the well during such drilling to serve a number of functions, including cooling and lubricating the drilling apparatus, counterbalancing the subterranean formation pressure encountered, and removing drill cuttings from the formation out of the wellbore. In removing drill cuttings from the well, drilling fluids suspend the cuttings and carry them to the surface for removal from the well.

Drilling deviated and horizontal wells have become increasingly common in the oil and gas industry. In drilling such wells, gravity causes deposits of drill cuttings, the sizes of which range from microns in diameter to that of common pebbles, and especially fines or smaller sized cuttings, to build up along the lower or bottom side of the wellbore. Such deposits are commonly called "cuttings beds." As used herein, the term "deviated" with respect to wells shall be understood to include any well at sufficient angle or deviation off of vertical that cuttings beds tend to form during the drilling operation. "Deviated" wells shall be understood to include without limitation "angled," "high-angled," "oval," "eccentric," "directional" and "horizontal" wells, as those terms are commonly used in the oil and gas industry. The terms "well," "wellbore" and "borehole" are synonymous as used herein.

The viscosity of a drilling fluid is commonly increased to enhance the fluid's drill cuttings-transport capability. However, pumping high-viscosity fluids can be disadvantageous to the economics of oil well drilling by effecting high friction pressure, requiring higher horsepower pumping equipment and subsequent higher fuel expenditure. Higher drilling fluid viscosity is advantageous only in the annular space between drill pipe and borehole, where drill cuttings are located and from which they need to be removed. In other locations within the well during drilling, primarily inside the drillpipe and flow channels within the bit, lower viscosity is preferred for the drilling mud so as to minimize frictional pressure loss. The narrower flow channels inside the drillpipe and drill bit cause the drilling fluid to undergo a higher shear rate, which also increases frictional pressure loss. To counteract this undesirable occurrence, drilling fluids currently in common use are referred to as "shear-thinning" fluids because they have been designed to have a higher viscosity when at lower shear rate and lower viscosity in higher shear rate conditions. This serves, to some extent, to satisfy both the need for higher viscosity in the wellbore annulus and lower viscosity inside the drill pipe and drill bit. However, the current state of the art in drilling fluids design allows for only a limited degree of control of the variance in fluid viscosity between these various locations in the well being drilled.

Cleaning (i.e., removing drill cuttings from) a deviated well, particularly drilled at a high angle, can be difficult. Limited pump rate, limited drilling fluid density, eccentricity of the drill pipe, sharp build rates, and oval-shaped wellbores can all contribute to inadequate hole cleaning. In turn, inadequate hole cleaning can lead to cuttings beds build-up in the wellbore, because commonly used drilling fluids are often unable to sufficiently remove cuttings from such cuttings beds while circulating through the wellbore.

Buildup of cuttings beds can lead to undesirable friction and possibly to sticking of the drill string. Such buildup is especially a problem in Extended Reach Drilling, in which the majority of the length of the well is deviated from vertical by more than 40 degrees.

Well treatments or circulation of fluids specially formulated to remove these cuttings beds are periodically necessary to prevent buildup to the degree that the cuttings or fines interfere with the drilling apparatus or otherwise with the drilling operation. Two commonly used types of treatment fluids that have been applied with limited success are highly viscous fluids, having greater viscosity than the drilling fluids being used in the drilling operation, and lower viscosity fluids, having less viscosity than the drilling fluids being used in the drilling operations. Commonly, the drilling operation must be stopped while such treatment fluids are swept through the wellbore to remove the fines. It is desired, but difficult, to prevent intermixing of these treatment fluids with the drilling fluid. Such occurrences can be problematic in that they may alter the physical properties, such as density, of the drilling fluid.

A new method taught in U.S. Pat. No. 6,290,001, issued Sep. 18, 2001 to West et al., enables a sweep without stopping the drilling operation. In that method, a sweep material is added to the wellbore drilling fluid, either directly or in a carrier fluid compatible with the drilling fluid. The sweep material is circulated in the well, where it dislodges, suspends or pushes drill cuttings, especially fines and smaller sized cuttings deposited on the lower side of the wellbore or in cuttings beds, to the surface of the well. The sweep material is then removed from the drilling fluid, preferably by sieving or screening, so the drilling fluid may be returned to the wellbore without significant change in density. The sweep material comprises a weight material, such as barium sulfate, that has been ground and sieved to a specific grind size sufficiently small to be suspendable in the drilling fluid and generally harmless to the fluid pumping apparatus but sufficiently large to be screened out of the drilling fluid, preferably by the principal shale shaker for the drilling operation.

There continues to be a need, however, for more methods and materials for removing drill cuttings from wellbores.

SUMMARY OF THE INVENTION

The method of the present invention employs a drilling fluid whose viscosity increases after the fluid passes through the drill bit nozzles in the borehole and decreases after the fluid returns to the well surface. This viscosity change is effected by using a drilling fluid containing a polymer that can be caused to crosslink (which increases the fluid's viscosity) downhole. The crosslinking can be reversed after the fluid returns to the well surface to facilitate ease of removal of drill cuttings and recycling of the drilling fluid.

Such delayed and reversible crosslinking may be effected in a number of ways. A preferred approach is to provide a drilling fluid comprising an aqueous base, a crosslinkable polymer, and a crosslinking agent. A crosslink activator encapsulated in an encapsulant is provided in the drilling fluid. The crosslink activator may be the crosslinking agent or it may be an agent that facilitates crosslinking of the polymer by the crosslinking agent, such as a pH adjusting compound. The encapsulant comprises a material or composition that can maintain its integrity and contain the crosslink activator apart from the polymer when introduced into the fluid before injection into the well but which breaks up or dissolves in the wellbore releasing the crosslink activator into the drilling fluid. The breaking up or dissolving of the encapsulant may be due to shearing caused by passing the fluid through the drill nozzles or may be due to increased temperature in the wellbore. Other suitable means for breaking up or dissolving of the encapsulant may alternatively be used. Once released into the drilling fluid, the crosslink activator can effect the crosslinking of the polymer. The drilling fluid containing the crosslinking and crosslinked polymer is circulated in the wellbore where it entrains drill cuttings.

When the drilling fluid, which contains drill cuttings, reaches the well surface, the crosslinking is reversed (which reduces the fluid's viscosity). The drill cuttings are then removed from the fluid and additional encapsulated crosslinking activator is added back to the fluid (along with any other appropriate or needed additives, such as weighting agents to provide or maintain desired density, to complete the drilling fluid) for recirculation of the fluid in the wellbore.

An advantage of this method is that highly viscous fluids may be used for removing drill cuttings from the well without forcing such viscous fluids through the drill bit nozzles and hence without taxing pumping equipment. Further, such viscous fluids may be used as the drilling fluid, without altering the density of the drilling fluid, and without stopping the drilling for a sweep of the wellbore with viscous fluid to remove drill cuttings.

Another advantage of the method of the invention is that it allows flexibility during the drilling operation itself. The viscosity of the fluid may be adjusted as frequently as each cycle of drilling fluid in the wellbore. Although such frequency is not likely to be needed, it demonstrates the flexibility of the method. Thus, as the fluid rheology and other drilling conditions and subterranean formation characteristics (i.e., pore pressure, rock types, oil/gas/water saturation, etc.) are being monitored real-time during drilling, and if such formation characteristics and drilling conditions change, the fluid viscosity may be changed according to the method of the invention to quickly adapt to such changes in the formation. The fluid viscosity may be quickly changed by changing the amount or kind of crosslink activator being added back into the fluid at the well surface.

DETAILED DESCRIPTION OF THE PREFERRED EMBODIMENTS

The present invention provides a method for drilling a borehole in a subterranean formation employing a drilling fluid comprising a polymer viscosifier and an encapsulated crosslink activator for crosslinking the polymer viscosifier. The crosslinked polymer provides the fluid with viscosity and suspension capability to enable the fluid to suspend (or to better suspend) drill cuttings for transport out of the borehole. The polymer does not become fully crosslinked or provide the desired viscosification for the drilling fluid until after the fluid enters the borehole. Preferably, the crosslinking does not begin until after the fluid passes through the drill bit being used to drill the borehole. Once the fluid has reached the desired location in the borehole, however, the crosslinking should be relatively rapid to enable the fluid to quickly entrain drill cuttings for transport to the well surface.

A key element of the invention is that the crosslinking of the polymer is reversible, preferably easily and quickly, such that the viscosity of the fluid can be reduced when the fluid cycles or circulates back to the well surface for ease of removal of the drill cuttings and for preparation for return to the wellbore for recirculation.

Any drilling fluid containing polymer capable of reversibly crosslinking and consequent viscosity changes may be used in the present invention. Generally, the drilling fluids for use in this invention are comprised of water, depolymerized polymer (preferably fully hydrated), a pH-adjusting compound used to control the pH of the drilling fluid to an optimum level for crosslinking, and a crosslinking agent. In at least one embodiment of the invention, the crosslinking agent is encapsulated to delay crosslinking the depolymerized polymer. In at least one alternative embodiment of the invention, the pH adjusting compound used to control the pH of the drilling fluid to an optimum level for crosslinking is encapsulated to delay crosslinking the depolymerized polymer. Preferably the polymer used in the present invention will be a depolymerized polysaccharide polymer, and most preferably the polymer will be a depolymerized hydroxypropylguar.

Typically, the depolymerized polymer used in the invention will be maintained in concentrated form until the drilling fluid is prepared for use in drilling a wellbore. Such concentrate is preferably fully hydrated and can be stored for long periods of time prior to use. When the drilling fluid concentrate is fully hydrated, time for hydration is not needed when the concentrate is later mixed with additional water and any other desired additives to form a drilling fluid and the drilling fluid may be more quickly prepared. When the concentrate is mixed with water, preferably continuously, along with any additional additives required or desired, for producing the drilling fluid, the water is mixed with the concentrate in a water-to-concentrate ratio ranging from about 4:1 to about 20:1, depending upon the final viscosity desired in the drilling fluid. The water used may be fresh water, unsaturated salt water including brines or seawater, or saturated salt water. As used herein particularly with respect to preparation of the polymer or the drilling fluid for use in the present invention, the term "water" shall be understood to be any of these types of water. Such mixing of the drilling fluid concentrate with water and other additives can be done quickly with little delay in readying the resultant drilling fluid for pumping into the drill pipe. Consequently, the properties of the drilling fluid can be periodically or continuously changed during the time that drilling and pumping of the drilling fluid takes place.

A fully hydrated depolymerized polymer suitable for preferred use in the invention may be manufactured by various means known to those skilled in the art. For example, the polymer may be manufactured by forming a hydratable polymer having a relatively high molecular weight as a result of derivatization of a polysaccharide and then subjecting it to extensive depolymerization whereby the polymer backbone is divided into short chain polymer segments. The manufacture of such polymers can be performed by, for example, Rhodia Inc. of Cranberry, N.J. using well known derivatization and depolymerization techniques.

The hydratable polymer used for forming the short chain segments may be any polysaccharide and is preferably a guar derivative polymer selected from the group consisting of hydroxypropylguar, carboxymethylhydroxypropylguar, carboxymethylguar, hydroxyethyl cellulose, carboxymethyl cellulose, carboxymethylhydroxyethyl cellulose, and the like. Of these, depolymerized hydroxypropylguar is preferred. Polyacrylamides and/or polyacrylonitriles may also be used instead of or in addition to polysaccharides. The depolymerized polymer should have an average molecular weight in the range of from about 25,000 to about 400,000 and preferably has an average molecular weight in the range of from about 50,000 to about 250,000. If desired for purposes of transportation, storage or otherwise, the depolymerized polymer may be stored in dry form, and, when needed, may be rehydrated to form the drilling fluid concentrate. Fully hydrated depolymerized polymer is preferably admixed with water in an amount in excess of about 8% by weight of the drilling fluid concentrate to form the drilling fluid concentrate. Preferably, the polymer is present in an amount of from about 8% to about 25% or more by weight and most preferably from about 8% to about 15% by weight of the drilling fluid concentrate. The viscosity of the drilling fluid concentrate generally may be in the range of from about 1,000 to in excess of about 35,000 cps as determined with a Brookfield DV II+RV spring viscometer manufactured by Brookfield Engineering Laboratories in Middleboro, Mass.

In some instances it may be desirable to add a dispersing agent to the polymer. This agent helps to disperse depolymerized hydratable polymer when it has been stored in a dry form, and also facilitates rehydration of such polymer in water. Dispersing agents found to be particularly suitable include light hydrocarbon oils such as polyethylene glycol, diesel oil, kerosene, olefins and the like. Of these, polyethylene glycol is preferred. When a dispersing agent is used, it is included with the polymer in an amount ranging from less than about 5% to about 60% or more by weight of the polymer.

A variety of other additives may be included in a drilling fluid concentrate at the time of its manufacture for use in this invention. In at least one embodiment, such additives may include pH-adjusting compounds to control the pH of the drilling fluid to achieve an optimum or desired level for crosslinking when mixed with additional water to form a drilling fluid. Examples of such compounds which may be used include, but are not limited to, sodium hydroxide, potassium hydroxide, lithium hydroxide, various carbonates or any other commonly used pH control agents which does not adversely react with the polymer to obstruct its use. Of these, sodium hydroxide is preferred. When used or added to the drilling fluid concentrate, the pH adjusting compound is included in the concentrate in an amount ranging from about 0.5% to about 10% by weight of the water therein.

A pH buffer may also be included in the concentrate. Examples of buffers which may be used include, but are not limited to, sodium carbonate, potassium carbonate, sodium bicarbonate, potassium bicarbonate, sodium or potassium diacetate, sodium or potassium phosphate, sodium or potassium hydrogen phosphate, sodium or potassium dihydrogen phosphate and the like. When used, the buffer is included in the concentrate in an amount ranging from about 0.5% to about 10% by weight of the water therein.

Another additive which may be included in the drilling fluid concentrate is a surfactant for preventing the formation of emulsions between the fluid which is formed with the concentrate and subterranean formation fluids. Examples of surfactants which may be used include, but are not limited to alkyl sulfonates, alkyl aryl sulfonates including alkyl benzyl sulfonates such as salts of dodecylbenzene sulfonic acid, alkyl trimethylammonium chloride, branched alkyl ethoxylated alcohols, phenol-formaldehyde nonionic resin blends, cocobetaines, dioctyl sodium sulfosuccinate, imidazolines, alpha olefin sulfonates, linear alkyl ethoxylated alcohols, trialkyl benzylammonium chloride and the like. Of these, salts of dodecylbenzene sulfonic acids are preferred. When used, the surfactant is included in the concentrate in an amount ranging from about 0.01% to about 10% by weight of the water in the drilling fluid.

Another additive which may be included in the drilling fluid concentrate is a clay stabilizer. Examples of clay stabilizers which may be used include, but are not limited to, potassium chloride, sodium chloride, ammonium chloride, tetramethyl ammonium chloride, and the like. Of these, potassium chloride and tetramethyl ammonium chloride are preferred. When used, the clay stabilizer is included in the concentrate in an amount ranging from about 2% to about 20% by weight of the water therein.

Any of the additives to the drilling fluid concentrate discussed above may be alternatively added (or even additionally added) to the drilling fluid itself. The drilling fluid is prepared from the drilling fluid concentrate by adding water to the concentrate and by adding other additives needed to complete the fluid as a drilling fluid, particularly if such additives are not in the concentrate. For example, weighting agents such as, for example, calcium carbonate, barite, hematite, strontium sulfate, and amorphous silica, will likely be added to the fluid to increase the density of the fluid to the weight needed for the particular subterranean formation and use of the fluid.

In order to increase the viscosity of the drilling fluid formed with or from the drilling fluid concentrate, a crosslinking agent is mixed with the water and drilling fluid concentrate and/or with the drilling fluid. In at least one embodiment of the invention, such mixing preferably occurs downhole. The crosslinked short chain segments of the fully hydrated depolymerized polymer are crosslinked by the crosslinking agent thereby producing a viscous drilling fluid.

The crosslinked drilling fluids of the present invention produce filter cake containing low molecular weight polymer segments which make the filter cake easily removable. When crosslinkers discussed below are used, the crosslinks are broken simply by lowering the pH to a level below about 9. In this pH range, the drilling fluid is generally not crosslinked and yet the acetal linkages which form the crosslinking sites are generally stable and can be recrosslinked. This feature allows the drilling fluid to be recovered from drilling the borehole and reused rather than having to be disposed of or discarded. This recycling of the drilling fluid reduces waste-disposal costs and avoids or alleviates environmental concerns that may become associated with waste disposal. The recovery and reuse of the drilling fluids of this invention makes them much more economical to use than conventional prior-art drilling fluids.

Examples of preferred crosslinking agents (which may be used in the drilling fluid to effect the crosslinking as described above) include, but are not limited to: boron compounds such as, for example, boric acid, disodium octaborate tetrahydrate, sodium diborate and pentaborates, ulexite and colemanite; compounds which can supply zirconium IV ions such as, for example, zirconium lactate, zirconium lactate triethanolamine, zirconium carbonate, ziroconium acetylacetonate and zirconium diisopropylamine lactate; compounds that can supply titanium IV ions such as, for example, titanium ammonium lactate, titanium triethanolamine, titanium acetylacetonate; aluminum compounds such as aluminum lactate or aluminum citrate; or compounds that can supply antimony ions. Of these, a borate compound is the most preferred. The exact type and amount of crosslinking agent or agents used depends upon the specific depolymerized polymer to be crosslinked, temperature, fluid loss, and other formation conditions and factors known to those skilled in the art. The crosslinking agent used in the drilling fluid ranges in concentration from about 50 ppm to about 5000 ppm of active crosslinker.

According to the method of the invention, crosslink activators, which are either the crosslinking agents or pH-adjusting compounds, are encapsulated with a material that preferably helps to delay their interaction with the crosslinkable polymer in the drilling fluid, such as, for example, a material that is insoluble or only slightly soluble in an aqueous environment. This delay mechanism allows the drilling fluid to become viscosified or crosslinked at desirable times and locations. U.S. Pat. No. 5,591,700 to Harris, et al., issued Jan. 7, 1997, U.S. Pat. No. 5,604,186 to Hunt et al., issued Feb. 18, 1997, U.S. Pat. No. 6,187,720 to Acker et al., issued Feb. 13, 2001, U.S. Pat. No. 6,209,646 to Reddy et al, issued Apr. 3, 2001, and U.S. Pat. No. 6,357,527 to Norman et al, issued Mar. 19, 2002, the entire disclosures all of which are incorporated herein by reference, provide various methods and means for encapsulating chemical additives to delay their interactions with the fluids in which they are being mixed. These methods and means provide examples that may be applied in the present invention for encapsulating the crosslink activators. Typically, the crosslink activators are released or unencapsulated or the encapsulation is destroyed or dissolved at warmer temperatures encountered in a subterranean formation or when subjected to shear as when passing through the nozzles of a drill bit.

When the preferred crosslinking agent being used is a borate compound, the pH-adjusting compound is used to elevate the pH of the drilling fluid to above about 9. At that pH, the borate compound crosslinking agent crosslinks the short-chain hydrated polymer segments. When the pH of the crosslinked drilling fluid falls below about 9, the crosslinked sites are no longer crosslinked.

In order to cause or help the drilling fluid to revert (preferably completely) to a thin or less viscous fluid in a short period of time, a delinker capable of lowering the pH of the drilling fluid may be included in the drilling fluid initially or may more preferably be added to the drilling fluid at the well surface when the fluid returns to the surface after circulation in the wellbore. If added initially, the delinker should be a delayed delinker and preferably should be encapsulated so as not to interfere with the crosslinking in the wellbore. The action of such delinker should preferably be delayed until the fluid has been circulated in the borehole and returned to the well surface. In one alternative embodiment, a delayed delinker and/or delayed breaker is used where the delay is so long as to not delink or break until some time after the fluid has circulated and deposited some of such fluid on the wellbore wall as filtercake. The delayed delinker or delayed breaker may then act to break down the filter cake to help bond cement to the formation wall (in a cementing operation) or to minimize the obstruction of a production surface area after the zone has been gravel packed. In this particular alternative embodiment, however, as with other embodiments, the delinkers or breakers that are not delayed may be added to the drilling fluid when it circulates back to the well surface to enhance or hasten the reversal of the crosslinking to prepare the fluid for recycling back into the borehole.

Examples of delinkers which may be used include, but are not limited to, various lactones, hydrolyzable esters, and acids. Of these, the hydrolyzable esters are preferred. Examples of delayed delinkers include these same delinkers when put in encapsulated form, and also slowly soluble acid generating compounds. The delinker may be included in or added to the drilling fluid in an amount ranging from about 0% to about 5% by weight of the water therein. Alternatively, any of the conventionally used breakers employed with metal ion crosslinkers may be used in addition to or instead of delinkers. Examples of such breakers include oxidizers such as sodium persulfate, potassium persulfate, magnesium peroxide, ammonium persulfate, and the like. Enzyme breakers that may be employed include alpha and beta amylases, amyloglucosidase, invertase, maltase, cellulase and hemicellulase. The specific breaker and/or delinker used, whether or not either or both are encapsulated, as well as the amount thereof employed will depend upon the breaktime desired, the nature of the polymer and crosslinking agent, formation characteristics and conditions, and other factors in keeping with the purposes of the invention.

As previously discussed, after the fluid has been uncrosslinked and the drill cuttings removed, the fluid may be prepared for recycling back into the wellbore. Such preparation will likely include adding crosslink activator back into the fluid and adding any additional crosslinking agent needed (if different from the crosslink activator). Other additives such as additional weighting agent may be needed or desired and added as well.

Preferably, the drilling fluid according to the invention is prepared by metering the drilling fluid concentrate or used drilling fluid that has been uncrosslinked and had drill cuttings removed into a blender wherein it is mixed with additional water and/or additives which also may be metered into the blender or otherwise added to the fluid. The mixture may then be pumped, preferably simultaneously, out of the blender and into the drillpipe, wherein it proceeds downhole. The time period, starting from when the metering, mixing and pumping process starts to when the formed drilling fluid reaches the drill bit and subterranean formation to be drilled, is usually and preferably a time period of only several minutes. This ease and speed of preparation allows changes in the properties of the drilling fluid to be made on the surface as required during the time the drilling fluid is being pumped. For example, in a drilling procedure carried out in a subterranean formation which involves layers or zones of shale and sandstone, changes may be made to the drilling fluid in response to continuously monitored downhole parameters to achieve desired borehole stability, or to minimize damage to the formation wall, or to minimize fluid loss or invasion. Fluid loss control capability, viscosity, pH, salinity, to name a few, are some properties of the drilling fluid that may be continuously measured on the surface and changed as required to achieve optimum downhole treatment results in real time.

In an alternative embodiment of the invention, the principles of the invention may be used for a viscous sweep instead of for a drilling fluid. In this application, more crosslinkable polymer and/or more crosslinker may be used so that the fluid can be made more viscous than is typically preferred for a drilling fluid, although the fluid should not be capable of becoming so viscous as to lose its ability to be circulated in the borehole. The fluid may also have more suspension agents. As with the embodiments for the drilling fluid, the crosslink activator is encapsulated so that the polymer does not crosslink or does not fully crosslink until in the borehole. The fluid is then circulated in the borehole to entrain drill cuttings, and particularly drill cuttings that may have settled into cuttings beds or otherwise not been removed by the drilling fluid in the routine drilling operation. The sweep fluid is then brought to the well surface with the cuttings for removal. As with the drilling fluid embodiments of the invention, at the well surface, the viscosity of the drilling fluid is reduced for ease of removal of the drill cuttings. Such reduction in viscosity may be obtained by delinkers and/or breakers as used in the drilling fluid embodiments of the invention. Encapsulated crosslink activators may then be added back to the fluid for repeat of the treatment or viscous sweep. As with the drilling fluid embodiments, when the encapsulated crosslink activator contains a base for increasing the pH of the drilling fluid to crosslinking conditions, the sweep fluid should contain a crosslinker that causes crosslinkable polymer in the fluid to crosslink at that pH. When the encapsulated crosslink activator contains a crosslinker, the sweep fluid should contain a polymer in the fluid that is crosslinkable by that crosslinker and the sweep fluid should be maintained at a pH conducive to such crosslinking when crosslinking is desired, as when the fluid is in the borehole. An advantage of the present invention over prior art viscous sweeps is the ability of the fluid of the present invention to be quickly prepared for recycling or reuse in the borehole.

The foregoing description of the invention is intended to be a description of preferred embodiments. Various changes in the details of the described composition and methods may be made without departing from the intended scope of this invention as defined by the appended claims.

What is claimed is:

1. A method for drilling a borehole in a subterranean formation employing a drill bit, said method comprising:

providing a drilling fluid comprising a polymer viscosifier and an encapsulated crosslink activator for crosslinking said polymer viscosifier, introducing said drilling fluid into the borehole;

allowing said crosslink activator to become released from said encapsulation after passing through said drill bit;

allowing said crosslink activator to cause said polymer to crosslink and increase the viscosity of said drilling fluid;

entraining drill cuttings in said drilling fluid;

bringing said drill cuttings and said drilling fluid to the surface of the borehole;

reducing the viscosity of said drilling fluid;

removing said drill cuttings from said drilling fluid;

adding encapsulated crosslink activator to said drilling fluid; and returning said drilling fluid to said borehole.

2. The method of claim 1 wherein said encapsulated crosslink activator comprises a base for increasing the pH of the drilling fluid to about 9 to about 12 and said drilling fluid further comprises a crosslinker which causes crosslinking of said polymer at said pH of about 9 to about 12.

3. The method of claim 1 wherein said encapsulated crosslink activator comprises a crosslinker which causes crosslinking of said polymer upon contact with the same.

4. The method of claim 1 wherein the shear at the drill bit causes the encapsulant encapsulating the crosslink activator to break up, thereby releasing said crosslink activator.

5. The method of claim 1 where the temperature of the subterranean formation causes the encapsulant encapsulating the crosslink activator to dissolve thereby releasing said crosslink activator.

6. The method of claim 4 wherein said encapsulant comprises a material that may be broken by shearing.

7. The method of claim 5 wherein said encapsulant comprises a material that melts at subterranean temperatures.

8. The method of claim 2 where said crosslinker comprises borate and said polymer is selected from the group consisting of polysaccharides, polyacrylamides, polyacrylamide copolymers, and hydrolyzed polyacrylonitriles.

9. The method of claim 8 where said polysaccharides are selected from the group consisting of hydroxypropylguar, carboxymethylhydroxypropylguar, carboxymethylguar, hydroxyethyl cellulose, carboxymethyl cellulose, carboxymethylhydroxyethyl cellulose, galactomannan gum, cellulose, and other cellulose derivatives.

10. The method of claim 1 where said encapsulated crosslink activator comprises a crosslinker and said drilling fluid is maintained in said borehole at a pH conducive to said crosslinker crosslinking said polymer.

11. The method of claim 10 wherein said pH is between about 9 and about 12.

12. The method of claim 11 wherein said crosslinker comprises borate and said polymer is selected from the group consisting of polysaccharides, polyacrylamides, polyacrylamide copolymers, and hydrolyzed polyacrylonitriles.

13. The method of claim 12 wherein said polysaccharides are selected from the group consisting of galactomannan gum, cellulose, cellulose derivatives, and hydroxypropyl guar.

14. The method of claim 1 further comprising monitoring wellbore conditions and subterranean formation characteristics during said drilling, and adjusting the composition of said drilling fluid to adapt to changes in said conditions and characteristics.

15. The method of claim 1 further comprising adding other additives to said drilling fluid before returning said fluid to said borehole.

16. The method of claim 15 wherein said other additives comprise weighting agents.

17. A method for removing drill cuttings from a wellbore, said method comprising:

providing a fluid comprising a polymer viscosifier and an encapsulated crosslink activator for crosslinking said polymer viscosifier, introducing said fluid into the borehole;

allowing said crosslink activator to become released from said encapsulation after passing through said drill bit;

allowing said crosslink activator to cause said polymer to crosslink and increase the viscosity of said fluid;

entraining drill cuttings in said fluid;

bringing said drill cuttings and said fluid to the surface of the borehole;

reducing the viscosity of said fluid; and removing said drill cuttings from said fluid.

18. The method of claim 17 wherein said viscosity of said fluid is reduced by adding a delinker or breaker to said fluid.

19. The method of claim 18 wherein said delinker is a lactone, a hydrolyzable ester, an acid, or an acid generating compound.

20. The method of claim 18 wherein said breaker is an oxidizer or an enzyme breaker.

21. The method of claim 20 wherein said oxidizer is sodium persulfate, potassium persulfate, magnesium peroxide, or ammonium persulfate, and said enzyme breaker is alpha or beta amylase, amyloglucosidase, invertase, maltase, cellulase or hemicellulase.

22. The method of claim 17 wherein said fluid is a drilling fluid.

23. The method of claim 17 wherein said fluid is a viscous sweep fluid.

24. The method of claim 17 wherein said viscosity is reduced by reducing the pH environment of the fluid to below about 9.

* * * * *